US008682570B2

(12) United States Patent
Tischer

(10) Patent No.: US 8,682,570 B2
(45) **Date of Patent: *Mar. 25, 2014**

(54) METHODS, SYSTEMS, DEVICES, AND COMPUTER PROGRAM PRODUCTS FOR IMPLEMENTING CONDITION ALERT SERVICES

(71) Applicant: AT&T Intellectual Property I, L.P., Atlanta, GA (US)

(72) Inventor: Steven Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,572

(22) Filed: Apr. 4, 2013

(65) Prior Publication Data

US 2013/0222155 A1 Aug. 29, 2013

Related U.S. Application Data

(63) Continuation of application No. 11/926,823, filed on Oct. 29, 2007, now Pat. No. 8,428,856.

(51) Int. Cl.
*G06F 19/00* (2011.01)

(52) U.S. Cl.
USPC ........... 701/117; 340/905; 340/934; 340/992; 340/994; 340/995.13; 340/995.19; 340/995.23; 340/995.27; 701/118; 701/119

(58) Field of Classification Search
USPC .................... 340/905, 934, 992, 994, 995.13, 340/995.19, 995.23, 995.27; 701/117–119
See application file for complete search history.

(56) References Cited

U.S. PATENT DOCUMENTS

| | | | | |
|---|---|---|---|---|
| 4,792,803 | A * | 12/1988 | Madnick et al. | 340/905 |
| 5,164,904 | A * | 11/1992 | Sumner | 701/117 |
| 5,774,827 | A * | 6/1998 | Smith et al. | 701/431 |
| 6,012,012 | A * | 1/2000 | Fleck et al. | 701/117 |
| 6,317,058 | B1 * | 11/2001 | Lemelson et al. | 340/910 |
| 6,539,302 | B1 | 3/2003 | Bender et al. | |
| 6,590,507 | B2 * | 7/2003 | Burns | 340/995.13 |
| 6,640,187 | B1 * | 10/2003 | Chenault et al. | 701/409 |
| 6,691,028 | B2 * | 2/2004 | Bullock et al. | 701/420 |
| 6,791,472 | B1 * | 9/2004 | Hoffberg | 340/905 |
| 6,804,524 | B1 * | 10/2004 | Vandermeijden | 455/456.1 |
| 6,804,602 | B2 * | 10/2004 | Impson et al. | 701/117 |
| 6,853,913 | B2 * | 2/2005 | Cherveny et al. | 701/461 |
| 6,967,592 | B2 * | 11/2005 | Bell et al. | 340/905 |
| 6,973,384 | B2 * | 12/2005 | Zhao et al. | 701/117 |
| 6,990,407 | B1 * | 1/2006 | Mbekeani et al. | 701/117 |
| 7,058,710 | B2 * | 6/2006 | McCall et al. | 709/224 |
| 7,221,287 | B2 * | 5/2007 | Gueziec et al. | 340/905 |
| 7,269,503 | B2 * | 9/2007 | McGrath | 701/117 |
| 7,443,964 | B2 | 10/2008 | Urban et al. | |
| 7,511,634 | B2 * | 3/2009 | Stehle et al. | 340/905 |

(Continued)

*Primary Examiner* — Daniel Wu
*Assistant Examiner* — Son M Tang
(74) *Attorney, Agent, or Firm* — Cantor Colburn LLP

(57) ABSTRACT

Methods, systems, devices, and computer program products for implementing condition alert services are provided. A method includes receiving information elements from a source that identify a condition, aggregating the information elements from the source with information elements from other sources that identify the same condition, and creating a composite file that includes the aggregated information elements representing each of the sources. The method also includes generating a condition alert from the composite file and transmitting the condition alert to a recipient communications device.

15 Claims, 8 Drawing Sheets

(56) References Cited

U.S. PATENT DOCUMENTS

| | | | | |
|---|---|---|---|---|
| 7,602,281 | B2 * | 10/2009 | Manz et al. | 340/505 |
| 7,610,151 | B2 * | 10/2009 | Letchner et al. | 701/424 |
| 7,746,794 | B2 * | 6/2010 | Sink | 370/245 |
| 7,792,277 | B2 * | 9/2010 | Shaffer et al. | 379/266.02 |
| 7,880,642 | B2 * | 2/2011 | Gueziec | 340/905 |
| 7,912,628 | B2 * | 3/2011 | Chapman et al. | 701/117 |
| 8,103,443 | B2 * | 1/2012 | Kantarjiev et al. | 701/423 |
| 8,159,535 | B2 * | 4/2012 | Kitani et al. | 348/148 |
| 2006/0168592 | A1 * | 7/2006 | Andrews et al. | 719/318 |
| 2008/0042825 | A1 * | 2/2008 | Denny et al. | 340/522 |
| 2008/0221783 | A1 * | 9/2008 | Boss et al. | 701/117 |
| 2008/0255754 | A1 * | 10/2008 | Pinto | 701/119 |
| 2009/0109020 | A1 | 4/2009 | Tischer | |

* cited by examiner

METHODS, SYSTEMS, DEVICES, AND COMPUTER PROGRAM PRODUCTS FOR IMPLEMENTING CONDITION ALERT SERVICES

CROSS REFERENCE TO RELATED APPLICATIONS

This application is a continuation of U.S. patent application Ser. No. 11/926,823, filed Oct. 29, 2007, the entire contents of which are incorporated herein by reference.

BACKGROUND

Exemplary embodiments relate generally to communications, and more particularly, to methods, systems, devices, and computer program products for implementing condition alert services.

Conditions or events that affect a particular region or group of people can happen unexpectedly. Conditions may be traffic related (e.g., a collision, traffic jam, disabled vehicle), road related (e.g., debris on road, pothole, disabled traffic light), weather related (e.g., severe thunderstorm, flooding), or health and safety related (e.g., chemical spill, terrorist threat), to name a few. Many of these types of conditions go unresolved for an extended period of time. This may be due, in part, to either a lack of knowledge by a governing agency charged with handling the type of condition, or the agency may not fully appreciate the severity of the condition resulting in a delayed response. It may also take significant travel time for the governing agency to arrive at the area in which the condition has occurred. As a result, unsuspecting individuals who are in the region of the condition may find themselves unwittingly face-to-face with it.

Most often, a condition is reported to a governing agency (e.g., police, fire, emergency service providers) by one or more individuals who are first on the scene to discover it. However, other individuals might benefit from obtaining this information at the time of first discovery as opposed to the time in which these individuals arrive in the area of the condition. For example, an individual who receives advance warning of a condition may be in a position to avoid the area in which the condition has occurred. If enough individuals are provided with advanced warning and avoid the region, it would certainly provide a benefit to both the individuals who are notified, as well as the governing agency or first responders who require fast and unobstructed access to the condition.

What is needed, is a way to communicate information concerning conditions at the time of discovery to relevant individuals or entities, such that the individuals or entities can take action to avoid the condition, and to enable greater access to the condition locations for those who are charged with addressing or resolving the condition.

BRIEF SUMMARY

Exemplary embodiments include methods for implementing centralized condition alert management services. A method includes receiving information elements from a source that identify a condition, aggregating the information elements from the source with information elements from other sources that identify the same condition, and creating a composite file that includes the aggregated information elements representing each of the sources. The method also includes generating a condition alert from the composite file and transmitting the condition alert to a recipient communications device.

Additional exemplary embodiments include systems for implementing centralized condition alert management services. A system includes a host system and a centralized condition alert management application executing on the host system. The centralized condition alert management application implements a method. The method includes receiving information elements from a source that identify a condition, aggregating the information elements from the source with information elements from other sources that identify the same condition, and creating a composite file that includes the aggregated information elements representing each of the sources. The method also includes generating a condition alert from the composite file and transmitting the condition alert to a recipient communications device.

Further exemplary embodiments include computer program products for implementing centralized condition alert management services. A computer program product includes instructions for causing a computer to implement a method. The method includes receiving information elements from a source that identify a condition, aggregating the information elements from the source with information elements from other sources that identify the same condition, and creating a composite file that includes the aggregated information elements representing each of the sources. The method also includes generating a condition alert from the composite file and transmitting the condition alert to a recipient communications device.

Further exemplary embodiments include methods for implementing proximity-based condition alerts. A method includes collecting information elements by a communications device that identify a condition, creating a condition file that includes the information elements and a condition file identifier, and determining a destination address for notification of the condition. The method also includes generating and transmitting a condition alert to the destination address. The condition alert includes the condition file.

Further exemplary embodiments include communications devices for implementing proximity-based condition alerts. A communications device includes a processor unit and a condition alert application executing on the processor unit. The condition alert application implements a method. The method includes collecting information elements that identify a condition, creating a condition file that includes the information elements and a condition file identifier, and determining a destination address for notification of the condition. The method also includes generating and transmitting a condition alert to the destination address. The condition alert includes the condition file.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Centralized condition alert management services and proximity-based condition alerts are provided in accordance with exemplary embodiments. The centralized condition alert management services provide prompt and targeted notifications of conditions that occur, which can potentially impact a large number of people. By registering for the service and providing user-defined preferences, the centralized condition alert management services process condition information (also referred to as information elements) and directly notify those registered users who have an interest in, or who may be affected by, the condition. The proximity-based condition alerts provide a means for individuals to create and disseminate their own condition alerts to other individuals within a geographic proximity of the condition, thereby providing advance warning of a condition that may affect the individuals who may be en route to, or nearby, a location in the vicinity of the condition. By using proximity-based condition alerts, individuals who may be affected by a condition may benefit from real-time notifications that may enable the individuals to take measures to avoid unnecessary exposure to the condition.

Figure 1:
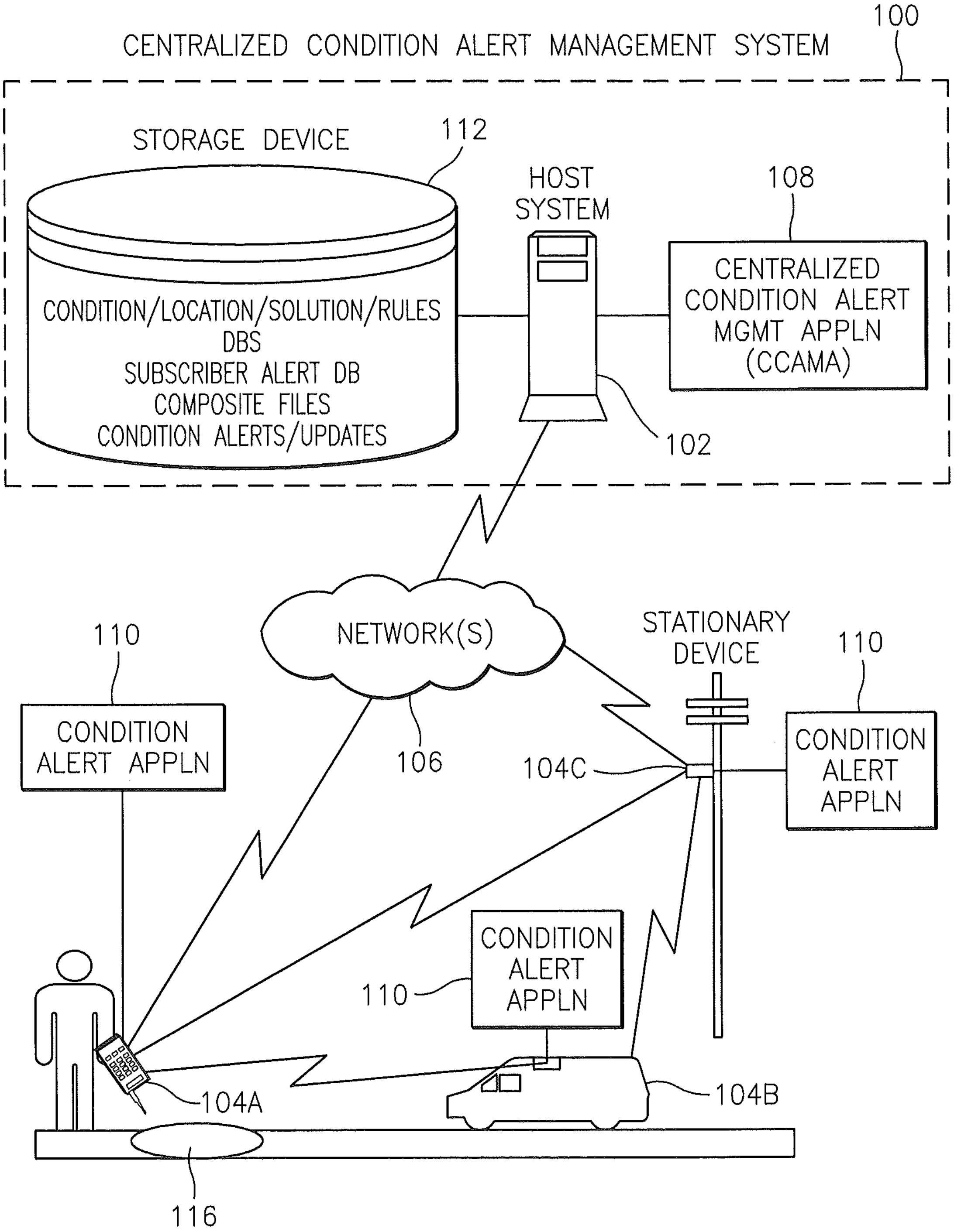
FIG. 1 is a block diagram describing a system upon which centralized condition alert management services and proximity-based condition alerts may be implemented in accordance with exemplary embodiments.

Turning now to FIG. 1, an exemplary system for implementing the centralized condition alert management services and the proximity-based condition alerts will now be described in accordance with exemplary embodiments. The system of FIG. 1 includes a centralized condition alert management system 100 in communication with one or more communications devices 104A-104C over one or more networks 106. The centralized condition alert management services are implemented via a host system 102 of the centralized condition alert management system 100.

The host system 102 may be implemented using a high-speed processing device (e.g., a computer system) that is capable of handling high volume activities conducted via users of the centralized condition alert management system 100. The host system 102 may be implemented by a network service provider, content service provider, or other enterprise, e.g., as a subscription-based service. The host system 102 executes a centralized condition alert management application (CCAMA) 108 for providing the centralized condition alert management services described herein.

The communications devices 104A and 104B represent mobile communications devices, such as cellular telephones, personal digital assistants, or other portable communications devices. As shown in the system of FIG. 1, the communications device 104A is a handheld device and communications device 104B is a device installed in a vehicle. The communications device 104C represents a stationary communications device that is installed at a fixed location. For example, as shown in FIG. 1, the communications device 104C is installed on a utility pole. The communications devices 104A-104C may operate over a wireless data network, using Internet protocols (e.g., TCP/IP) and may also be configured to include global positioning system (GPS) technology as will be described further herein. The communications devices 104A-104C execute a condition alert application 110 for implementing the proximity-based condition alerts described herein. The communications devices 104A-104C may also be configured to access a user interface of the CCAMA 108, e.g., via the networks 106, in order to utilize the services provided by the centralized condition alert management system 100.

The networks 106 may be implemented using wireless networks or any kind of physical network implementation known in the art. The communications devices 104A-104C may be coupled to the host system 102 through multiple networks so that not all of the communications devices 104A-104C are coupled to the host system 102 through the same network. In exemplary embodiments, the communications devices 104A-104C and the host system 102 may be connected to the networks 106 in a wireless fashion. In an exemplary embodiment, networks 106 include peer-to-peer networks that enable direct communication among the communications devices 104A-104C, which are within signal range of one another.

The host system 102 is also in communication with a storage device 112. The storage device 112 may be implemented using a variety of devices for storing electronic information. It is understood that the storage device 112 may be implemented using memory contained in the host system 102, or the storage device 112 may be a separate physical device. Information stored in the storage device 112 may be retrieved and manipulated via the host system 102.

The storage device 112 stores a condition database, a location database, a solution database, and a rules database. In addition, the storage device 112 stores a subscriber alerts database, composite files, and condition alerts and updates as described further herein. The condition, location, solution, and rules databases are shown and described in FIG. 6. A sample condition alert is shown in FIG. 7.

Figure 2:
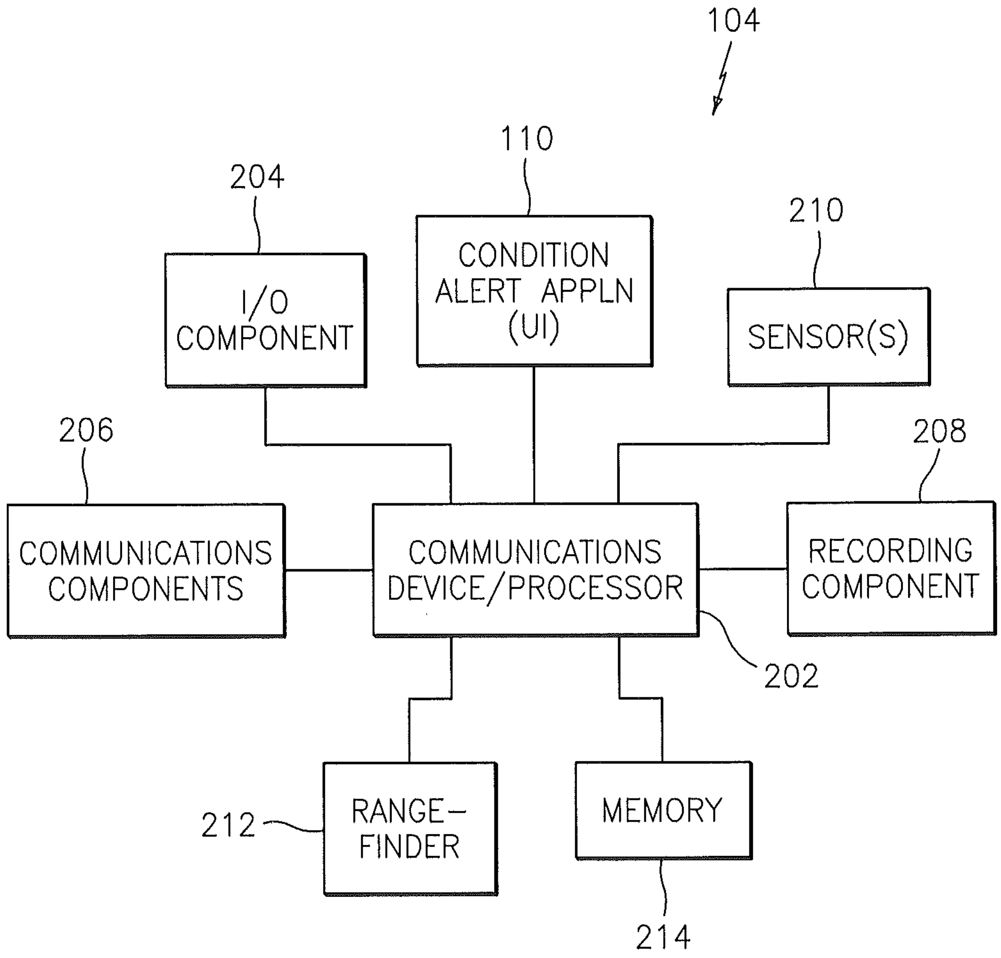
FIG. 2 is a block diagram depicting a communications device used in receiving the centralized condition alert management services and for implementing proximity-based condition alerts in exemplary embodiments.

Turning now to FIG. 2, an exemplary communications device 104 will now be described in accordance with exemplary embodiments. The communications device 104 includes a processor unit 202, an input/output component 204 for initiating and receiving condition alerts, a condition alert application 110 executing on the processor unit 202, and a communications component 206. In exemplary embodiments, the processor unit 202 executes the condition alert application 110 for facilitating the proximity-based condition alerts described herein. The input/output component 204 may include elements such as a keyboard and display screen. As described above, the communications device 104 may also be configured to access the user interface of the CCAMA 108 via the communications component 206 in order to utilize the services provided by the centralized condition alert management system 100. The communications component 206 may be configured to transmit communication signals (e.g., via a transmitter), including condition alerts created by the condition alert application 110, as well as reporting conditions via the user interface of the CCAMA 108. The communications component 206 may be configured to detect other communications devices in proximity of the communications device 104 and transmit condition alerts to these other communications devices over a peer-to-peer network (e.g., one of networks 106). Likewise, the communications component 206 may be configured to receive condition alerts generated by other communications devices 104.

In exemplary embodiments, the communications device 104 further includes a recording component 208, one or more sensors 210, and a range finder 212. The components 208, 210, and 212 collect information elements relating to a condition. For example, the recording component 208 may comprise a digital image capturing device, a video capturing device, an audio capturing device, or a combination thereof. Depending upon the type of condition that occurs, various measurements may be acquired by the communications device 104 using one or more sensors 210. For example, temperature readings may be acquired via a temperature gauge. In addition, navigational components may be employed to acquire elevation and azimuth information with respect to a condition. This information may provide point-of-view data that is useful in understanding critical aspects of the condition. For example, the point-of-view data for a condition, such as a fire may indicate the size and scope of the fire, as well as wind direction so that first responders can ascertain which adjacent structures may be impacted by the condition. In exemplary embodiments, the elevation or altitude readings may be acquired by a radar device or a GPS device (i.e., one of the communications components 206) using a triangulation calculation technique). Velocity, such as wind speed, may be tracked using an anemometer-type probe. These, and other types of sensors 110 and components, may be utilized in collecting various information elements for a condition alert.

The range finder 212 may be used for calculating a distance between the communications device 104 and the condition. The range finder 212 may be implemented, e.g., using laser, ultrawideband, or other range finding technologies. This information may be useful in accurately identifying a location in which the condition has occurred with greater specificity.

The communications device 104 also includes memory 214 which may be used by the condition alert application 110 when collecting these measurements before reporting a condition alert.

Figure 3:
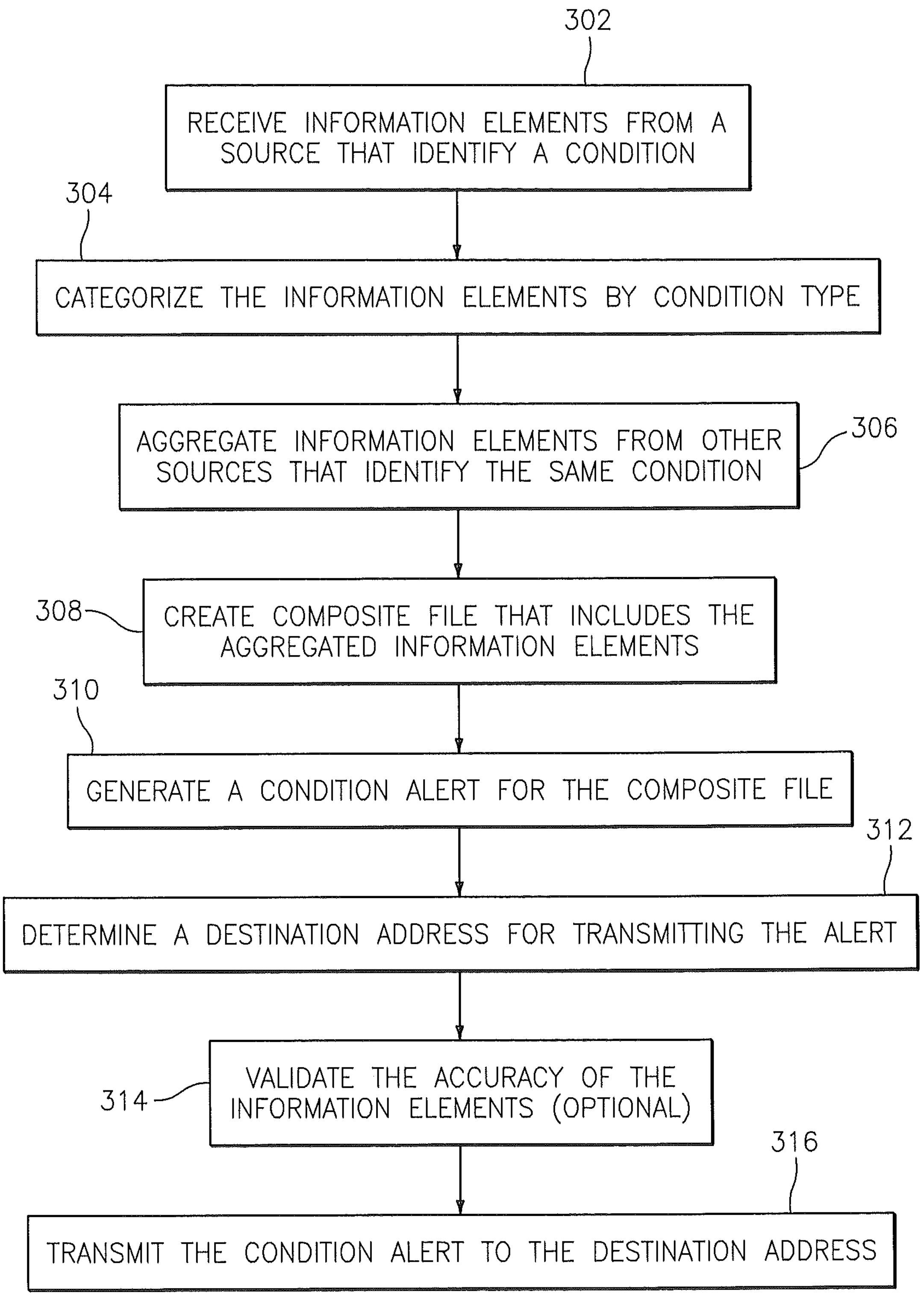
FIG. 3 is a flow diagram describing a process for implementing centralized condition alert management services in exemplary embodiments.
Figure 8:
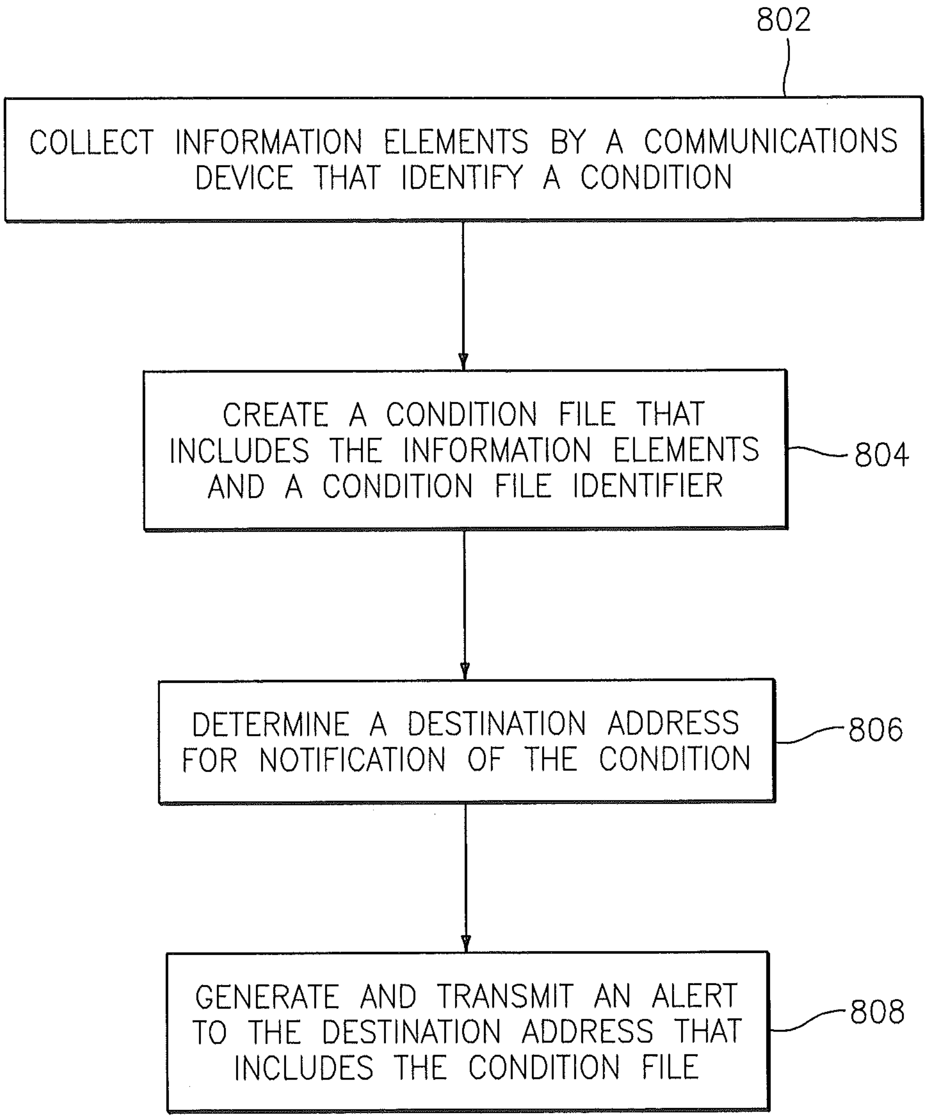
FIG. 8 is a flow diagram describing a process for implementing proximity-based condition alerts in exemplary embodiments.

The information elements may be sent to the centralized condition alert management system 100 for processing as described further in FIG. 3 (utilized in the centralized condition alert management services) or may be used to generate a condition alert by the condition alert application 110 (utilized in the proximity-based condition alerts), as described further in FIG. 8.

The condition alert application 110 may include a user interface configurable via the application 110. For example, a user interface screen 500 for entering information elements associated with a condition is shown and described in FIG. 5. Likewise, this type of user interface screen 500 may also be used in reporting a condition to the CCAMA 108. As indicated above the condition alert application 110 may also include a discovery feature for enabling the user to detect communications devices, such as the communications devices 104A-104C in proximity.

Figure 4:
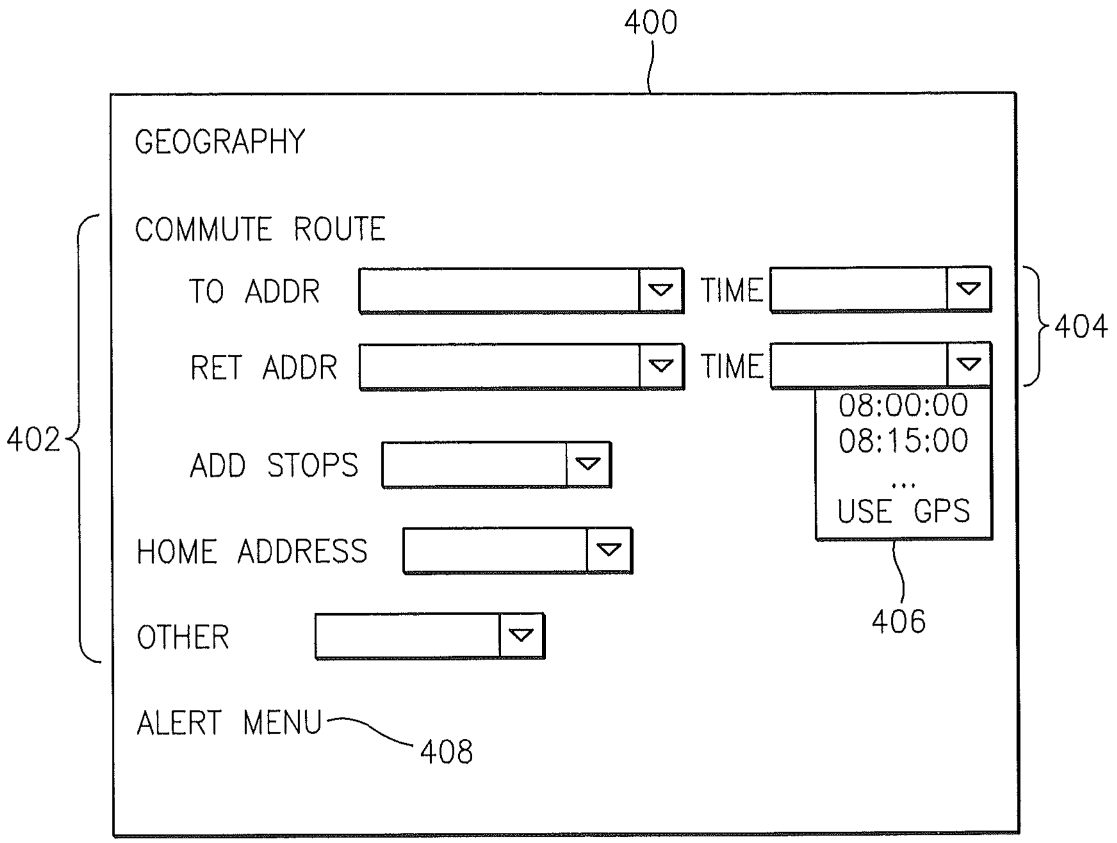
FIG. 4 is a user interface screen for registering for the centralized condition alert management services in exemplary embodiments.

Turning now to FIG. 3, a process for implementing centralized condition alert management services will now be described in accordance with exemplary embodiments. The centralized condition alert management services utilize various databases, such as databases 600A-600D of FIG. 6 and apply rules to the information therein as described herein. The processes described in FIG. 3 may require that a user register in order to receive the services. A user of the services may register for the services via, e.g., the user interface provided by the CCAMA 108. A sample user interface screen 400 for subscribing to the services is shown in FIG. 4. As illustrated in FIG. 4, a user may register for the services by providing information including preferences for condition alerts. For example, the user may specify a commuting route and approximate times of travel in fields 402, 404, and 406, which identify the geographic area and times in which the user expects to be present in the locations. Thus, should a condition be reported for the location entered by the user and at times close to those entered in the fields 402, 404, and 406, a condition alert would be transmitted to the user accordingly.

Figure 6:
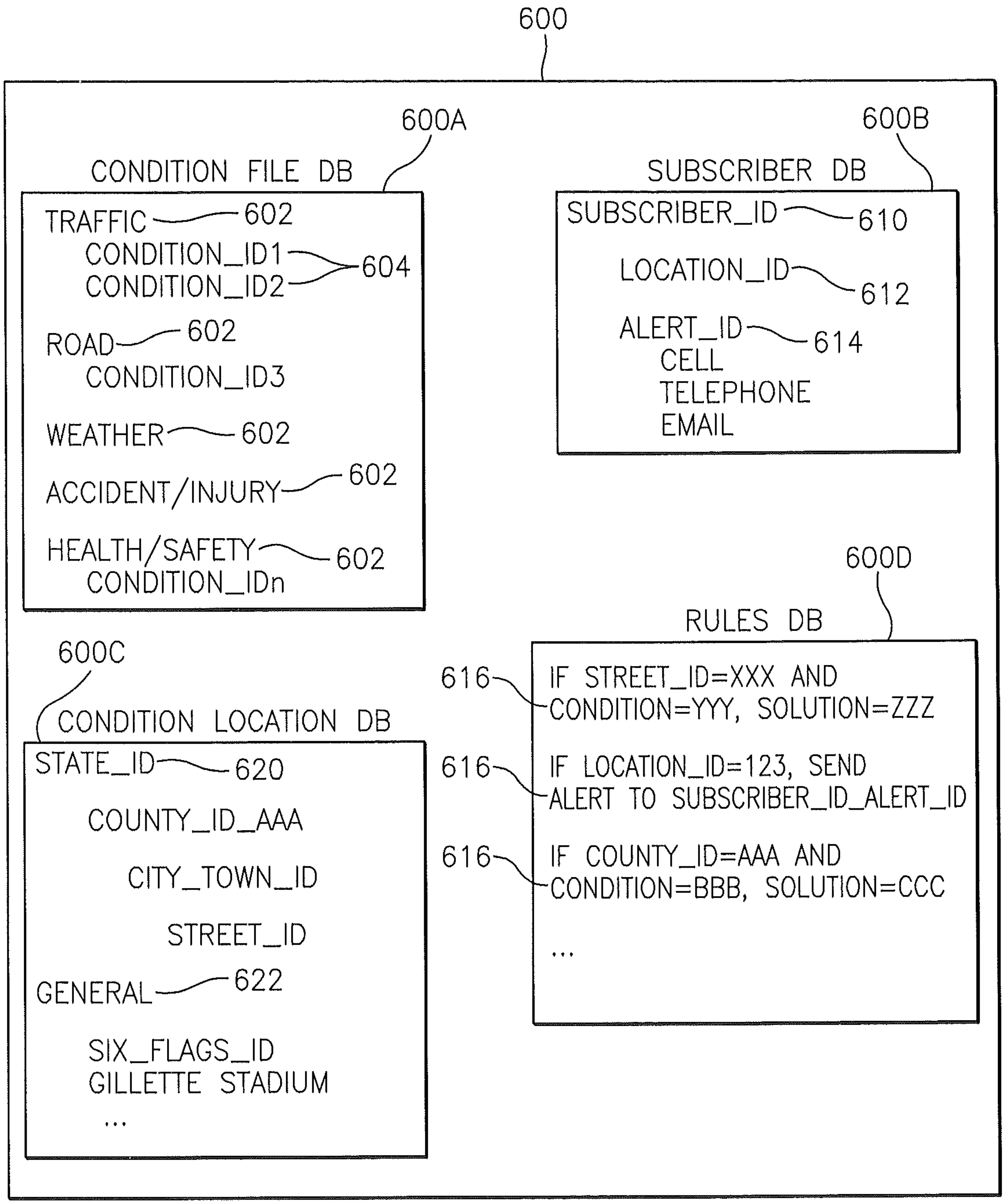
FIG. 6 illustrate sample databases used by the centralized condition alert management services in exemplary embodiments.
Figure 7:
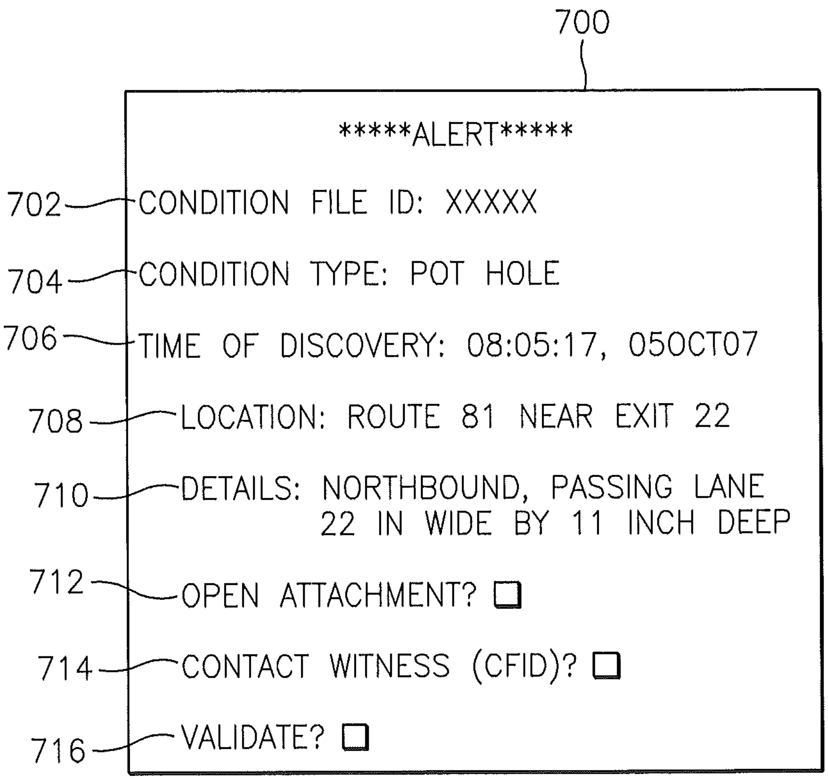
FIG. 7 is a user interface screen depicting a sample condition alert.

Once registered, a subscriber record is created that includes the information provided via the user interface screen 400 and is stored in the subscriber database 600B as shown in FIG. 6. In alternative exemplary embodiments, the user may select an automated GPS option via the field 406, which directs the application 108 to ascertain the user's current location prior to determining whether to transmit a condition alert. For example, if the user's current location is miles away from the condition, a condition alert may not be necessary. In addition, the CCAMA 108 may be configured to periodically ascertain the user's current location, particularly if the condition is severe. Thus, should the CCAMA 108 determine via the GPS that the user is within range of the condition, and the condition is still unresolved, a determination is made to send the condition alert to the user. As shown in the database 600B of FIG. 6, a subscriber identifier 610 distinguishes the subscriber record from other records in the database 600B. A location identifier 612 refers to the current location of the user (if using GPS).

Turning back to FIG. 4, an alert menu option 408 may be provided, whereupon selection thereof, the user is directed to a new interface screen (not shown) for entering additional preferences (e.g., a communications address to which a condition alert is to be sent if desired). For example, the user may desire to be notified of a condition alert via a particular means, such as cell phone, personal digital assistant, email account, or other desired means. This information may be stored in an alert identification field 614 of the subscriber record of the database 600B.

Figure 5:
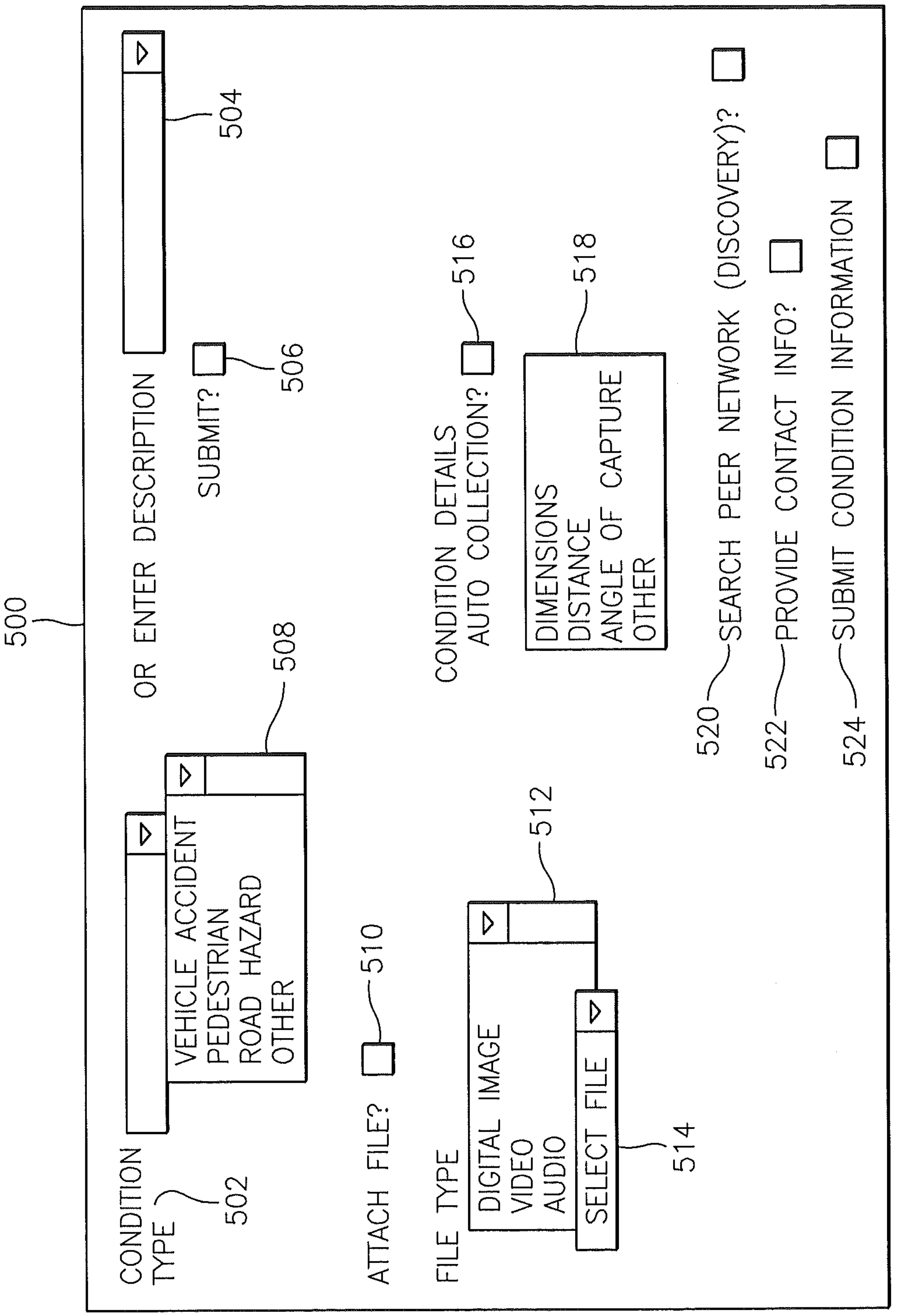
FIG. 5 is a user interface screen for reporting a discovered condition via a communications device in exemplary embodiments.

Returning now to FIG. 3, the host system 102 receives information elements from a source (e.g., communications device 104A) that identify a condition at step 302. As indicated above, the information elements may be provided via the user interface screen 500 as shown in FIG. 5. The information elements may include a condition descriptor that identifies the nature of the condition (e.g., pot hole in road, broken traffic light, hazardous debris in road, and chemical spill, to name a few). As shown in FIG. 1 for purposes of illustration, the condition comprises a pothole 116. This information may be entered, e.g., via a drop down list 508 by selecting a condition type field 502, or may be manually entered via a description field 504, followed by selecting a submit option 506.

In addition, the information elements may include the time of condition discovery, which may be automatically acquired by a clock feature of the communications device 104A (e.g., a timestamp). Information elements may also include the time of condition occurrence, which indicates the time in which the condition originated as opposed to discovered. The information elements may include the location of the condition, which may be automatically acquired via GPS on the device 104A or may be manually entered. Additionally, the information elements may include data that identify measurements taken, scope, and magnitude of the condition, positional and angular data identifying a point of view, and distance of the condition with respect to the communications device 104 at the time of information capture. As shown in the user interface screen 500 of FIG. 5, e.g., a user may select an auto collection feature 516 whereby the sensors 210 and/or rangefinder 212 collect various measurements as described above in FIG. 2. Alternatively, the user may select from one or more categories of measurements via a window 518 and manually enter actual or estimated measurements.

In addition, information elements may include an identification of the communications device 104 that identify the source (e.g., user's cell phone number) and one or more media files capturing media, such as audio, video, and static images of the condition. The user's identification may be optional if the user desires anonymity via a field 522 of the user interface screen 500. The media files may be captured via the recording component 208. The user then selects an option 510 to attach a file and selects the file type from a window 512, followed by the file to be attached from a window 514. These information elements are transmitted to the CCAMA 108 to report the condition via a submit option 524. Alternatively, if the user interface screen 500 is used to generate a proximity-based condition alert via the condition alert application 110, the information elements may be used to create a condition alert by the user of the communications device 104A as described further in FIG. 8.

At step 304, the CCAMA 108 categorizes the information elements by condition type. The condition types may include, e.g., traffic conditions, road conditions, weather conditions, and health and safety conditions. The CCAMA 108 may utilize pre-defined conditions and condition types, as shown in the condition database 600A of FIG. 6A. For example, the condition database 600A illustrates condition types in fields 602 and listings of conditions in fields 604. These condition types are provided by way of example only and are not to be construed as limiting in scope.

In addition, conditions that are reported are mapped to corresponding locations in which the conditions occur. The condition location database 600C illustrates types of information used in mapping condition information elements to respective condition locations. As shown in FIG. 6, e.g., the database 600C illustrates a State identification field 620 including a breakdown by county, city/town, and street. General locations may be defined in the database 600C as well. For example, familiar or well-known locations may be defined using a field 622.

At step 306, the CCAMA 108 aggregates the information elements from each of the sources (e.g., multiple communications devices 104A-104C) that identify the same condition (e.g., the pothole 116). For example, the composite file may aggregate measurements taken of the condition from multiple sources in order to clarify the extent or severity of the condition. This may be useful in situations where discrepancies in the information elements occur. Any outliers may be extracted from the composite file. Additionally, the aggregated information elements may be useful where a condition is likely to worsen over time. Aggregated information such as the time of condition discovery by communications devices, such as the communications devices 104A-104C, can be used to compare earlier acquired condition information with later acquired condition information (e.g., image data acquired for a pothole having dimensions that have changed/worsened over time).

At step 308, the CCAMA 108 creates a composite file that includes the aggregated information elements. For example, the composite file may aggregate measurements taken of the condition from multiple sources in order to clarify the extent or severity of the condition. This may be useful in situations where discrepancies in the information elements occur. Any outliers may be extracted from the composite file. Additionally, this may be useful where a condition is likely to worsen over time. For example, aggregated information such as the time of condition discovery by the communications devices 104A-104C can be used to compare earlier image data of the condition to later image data.

At step 310, the CCAMA 108 generates a condition alert for the composite file. A sample condition alert 700 is shown in FIG. 7. As shown in FIG. 7, the condition alert 700 may include a condition file identifier 702 that identifies the reported condition, a condition type 704, a time of discovery 706, location of the condition 708, and condition details 710. In addition, if a media file has been captured, the condition alert 700 may include an option 712 to open an attachment that reflects the media file. Additionally, if the source has provided personal information and approval, the condition alert may include an option 714 allowing the recipient of the condition alert 700 to contact the source. Also, the condition alert 700 may include a field 716 that enables the recipient to request validation of the condition. By selecting the option in the field 716, the CCAMA 108 may utilize updated or confirmed information elements acquired since the time the condition was reported and provide confirmatory or updated information as to the status of the condition over time.

At step 312, the CCAMA 108 determines a destination address for transmitting the condition alert. The destination address may be determined using the preferences provided in the user interface screen 400 of FIG. 4 as described above. Depending upon the nature and severity of the condition, rules may be applied for determining whether to notify a governing agency (e.g., department of public welfare (DPW), police, fire, ambulance, HAZMAT).

As indicated above, the CCAMA 108 may validate the accuracy and currency of the condition. Thus, at step 314, the CCAMA 108 validates the accuracy or currency of the information elements in response to a validation request via the field 716 of FIG. 7.

At step 316, the CCAMA 108 transmits the condition alert to the destination address(es).

In situations where the centralized condition alert management system 100 services a wide geographic region, it is likely that several concurrent conditions may be reported. The CCAMA 108 may be configured to process condition reports (i.e., information elements) from multiple sources (e.g., the communications devices 104A-104C), as well as for multiple varying conditions. In this scenario, the CCAMA 108 creates multiple composite files for each of the conditions reported. The CCAMA 108 may prioritize the composite files according to a severity level determined for each of the conditions. For example, suppose that a pothole, barn file, and chemical spill have all been simultaneously reported. The CCAMA 108 may assign a severity rating (also referred to herein as priority value) to each of the composite files, such that condition alerts are processed and transmitted to various entities or agencies based upon the severity rating. In this example, the CCAMA 108 may apply rules to the condition information elements and determine a severity rating of 90/100 for the chemical spill based upon the type of material leaked, considered with factors such as the general population of the area in which the condition has occurred. Likewise, a barn fire in a remote area may be ranked at 50/100, while the pothole located on a secondary road and having relatively small dimensions may be ranked as a 10/100. The CCAMA 108 may be configured to process condition alerts for composite files with a severity ranking that exceeds a pre-defined threshold. Sample rules for processing composite files are shown in the rules database 600D of FIG. 6 as rules 616.

Turning now to FIG. 8, a flow diagram describing a process for implementing proximity-based condition alerts will now be described in exemplary embodiments. As indicated above, a user of a communications device (e.g., device 104A) may generate a condition alert and disseminate the condition alert to any communications devices, such as the communications devices 104B-104C discovered to be in network communication with the communications device 104A. At step 802, the user collects information elements via the communications device 104A and condition alert application 110. As described above, the information elements may be automatically collected via the sensors 210 or range-finder component 212 of the communications device 104A by selecting this option 516 from the user interface screen 500 of FIG. 5. Alternatively, the information elements may be manually entered as described above in FIGS. 3 and 5. The information elements may include one or more media files as described above in FIGS. 3 and 5. At step 804, the condition alert application 110 creates a condition file that includes the information elements and the condition file identifier 702 (shown in FIG. 7). The condition file identifier 702 identifies the condition file and optionally, the source of the condition file. At step 806, the condition alert application 110 determines a destination address for distributing the condition file. As indicated above, the communications device 104A may be configured to discover other communications devices (e.g., devices 104B, 104C), using the communications component 206 over a peer-to-peer network, such as the network 106. As shown in the user interface screen 500 of FIG. 5, the user may select an option 520, which causes the condition alert application 110 to begin searching for a peer communications device. At step 808, a condition alert (e.g., the condition alert 700) is generated and transmitted to the destination address. The condition alert 700 includes the information in the condition file.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing centralized condition alert management services, comprising:

registering a user of an alert service, the registering including obtaining a commuting route including a street, times of travel on the commuting route and a communications address for a recipient communications device;

receiving information elements from a source that identify a condition, wherein the information elements include condition type, time of condition discovery, location of condition, data that identify the magnitude of the condition, positional and angular data identifying a point of view and distance of the condition with respect to the communications device at the time of capture and a media file capturing a static image of the condition;

aggregating the information elements from the source with information elements from other sources that identify the condition to define aggregated information elements;

creating a composite file that includes the aggregated information elements, the creating the composite file including extracting outlier information elements of the aggregated information elements from the composite file;

generating a condition alert from the composite file;

determining a condition alert location and condition alert time for the condition alert;

transmitting the condition alert to the recipient communications device when the condition alert location coincides with the commuting route and the condition alert time coincides with the times of travel, the condition alert including an option to view the static image of the condition;

applying rules to the information elements to determine a response action and assigning a priority value to the condition in response to application of the rules; and notifying emergency response systems when the priority value meets a threshold value set by the rules.

2. The method of claim 1, wherein the source includes a mobile communications device.

3. The method of claim 1, wherein the source includes a stationary communications device.

4. The method of claim 1, wherein the condition alert includes an option for requesting validation of the condition, the method further comprising:

validating accuracy of the information elements and providing a validation response to the recipient communications device upon request.

5. The method of claim 1, wherein:

transmitting the condition alert to the recipient communications device includes transmitting a condition alert having a high priority value to the recipient communications device before transmitting a condition alert with a low priority value to the recipient communications device.

6. An apparatus for implementing centralized condition alert management services, the apparatus comprising:

a processor; and a computer readable medium with computer-executable instruction stored thereon, that when executed by the processor cause the processor to initiate operations comprising:

registering a user of an alert service, the registering including obtaining a commuting route including a street, times of travel on the commuting route and a communications address for a recipient communications device;

receiving information elements from a source that identify a condition, wherein the information elements include condition type, time of condition discovery, location of condition, data that identify the magnitude of the condition, positional and angular data identifying a point of view and distance of the condition with respect to the communications device at the time of capture and a media file capturing a static image of the condition;

aggregating the information elements from the source with information elements from other sources that identify the condition to define aggregated information elements;

creating a composite file that includes the aggregated information elements, the creating the composite file including extracting outlier information elements of the aggregated information elements from the composite file;

generating a condition alert from the composite file;

determining a condition alert location and condition alert time for the condition alert;

transmitting the condition alert to the recipient communications device when the condition alert location coincides with the commuting route and the condition alert time coincides with the times of travel, the condition alert including an option to view the static image of the condition;

applying rules to the information elements to determine a response action and assigning a priority value to the condition in response to application of the rules; and notifying emergency response systems when the priority value meets a threshold value set by the rules.

7. The apparatus of claim 6, wherein the source includes a mobile communications device.

8. The apparatus of claim 6, wherein the source includes a stationary communications device.

9. The apparatus of claim 6, wherein the condition alert includes an option for requesting validation of the condition, the operations further comprising:

validating accuracy of the information elements and providing a validation response to the recipient communications device upon request.

10. The apparatus of claim 6, wherein:

transmitting the condition alert to the recipient communications device includes transmitting a condition alert having a high priority value to the recipient communications device before transmitting a condition alert with a low priority value to the recipient communications device.

11. A computer program product, tangibly embodied on a non-transitory computer readable medium, for implementing centralized condition alert management services, the computer program product including instructions that, when executed by a computer, cause the computer to perform operations comprising:

registering a user of an alert service, the registering including obtaining a commuting route including a street, times of travel on the commuting route and a communications address for a recipient communications device;

receiving information elements from a source that identify a condition, wherein the information elements include condition type, time of condition discovery, location of condition, data that identify the magnitude of the condition, positional and angular data identifying a point of view and distance of the condition with respect to the communications device at the time of capture and a media file capturing a static image of the condition;

aggregating the information elements from the source with information elements from other sources that identify the condition to define aggregated information elements;

creating a composite file that includes the aggregated information elements, the creating the composite file including extracting outlier information elements of the aggregated information elements from the composite file;

generating a condition alert from the composite file;

determining a condition alert location and condition alert time for the condition alert;

transmitting the condition alert to the recipient communications device when the condition alert location coincides with the commuting route and the condition alert time coincides with the times of travel, the condition alert including an option to view the static image of the condition;

applying rules to the information elements to determine a response action and assigning a priority value to the condition in response to application of the rules; and notifying emergency response systems when the priority value meets a threshold value set by the rules.

12. The computer program product of claim 11, wherein the source includes a mobile communications device.

13. The computer program product of claim 11, wherein the source includes a stationary communications device.

14. The computer program product of claim 11, wherein the condition alert includes an option for requesting validation of the condition, the operations further comprising:

validating accuracy of the information elements and providing a validation response to the recipient communications device upon request.

15. The computer program product of claim 11, wherein:

transmitting the condition alert to the recipient communications device includes transmitting a condition alert having a high priority value to the recipient communications device before transmitting a condition alert with a low priority value to the recipient communications device.

* * * * *